Nov. 29, 1927.
M. J. KRAUS
CAB FOR TRACTORS
Filed Aug. 13, 1925
1,650,757
2 Sheets-Sheet 2
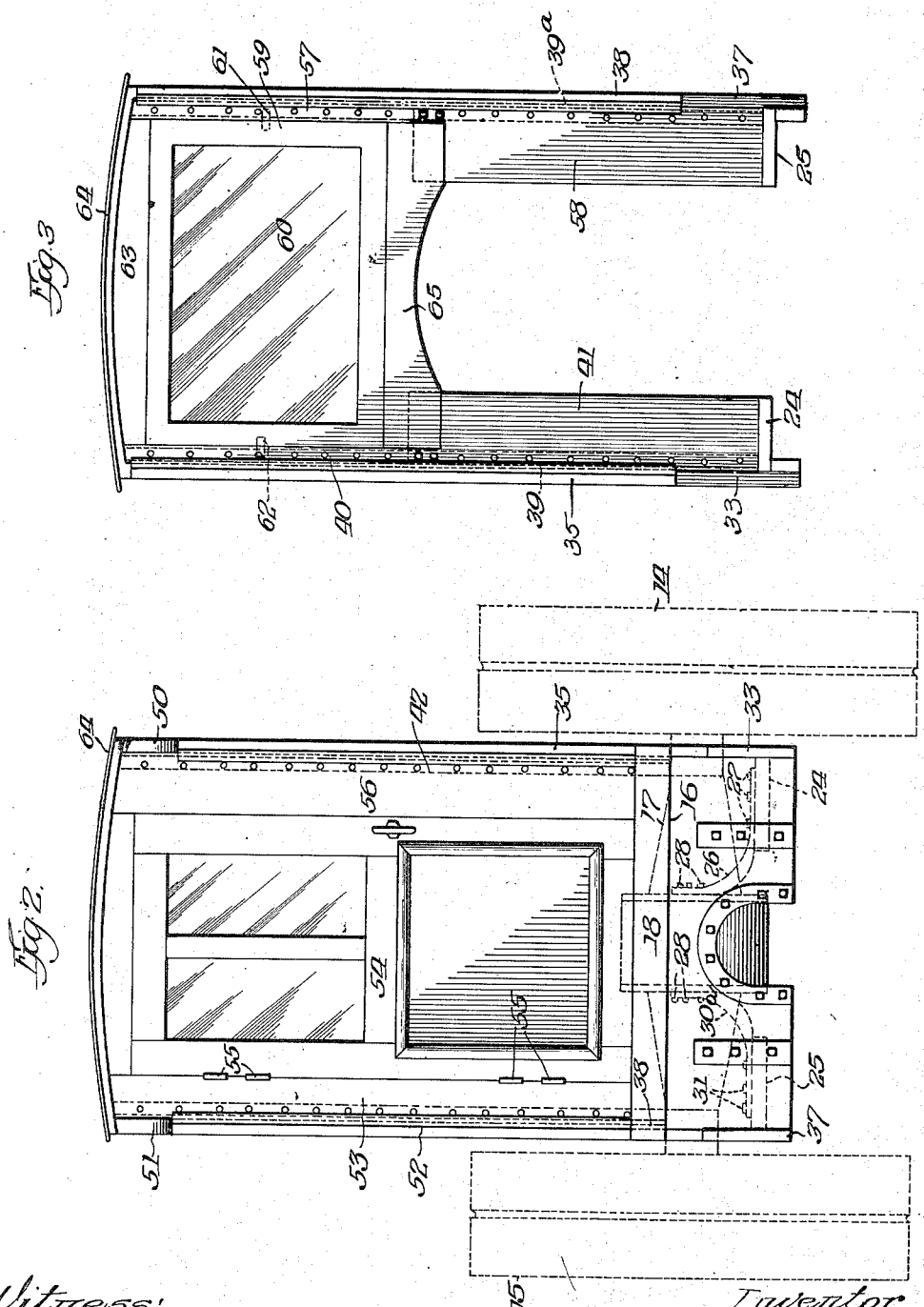

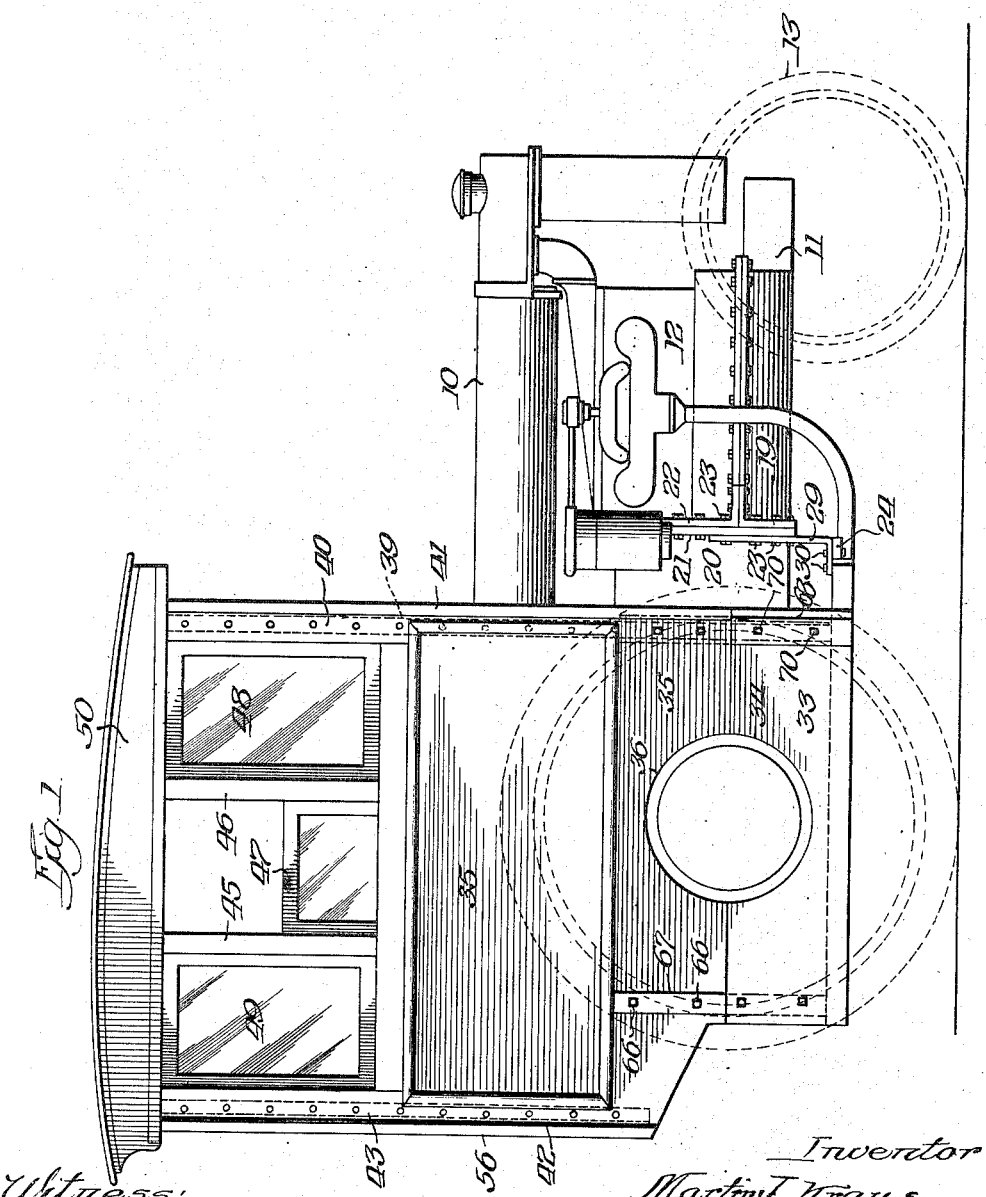

Patented Nov. 29, 1927.

1,650,757

UNITED STATES PATENT OFFICE.

MARTIN J. KRAUS, OF GARY, INDIANA.

CAB FOR TRACTORS.

Application filed August 13, 1925. Serial No. 49,909.

My invention relates to cabs for tractors and has particular reference to a cab designed for use upon a tractor of the Fordson type, for the purpose of protecting the operator of the cab from inclement weather.

The primary object of my invention is the provision of a cab for tractors which has a bottom frame-work with provisions thereon for attaching the frame to a tractor and upon which the housing from the cab is built, the bottom frame and attaching means to the tractor affording flexibility and being easily and simply attached to the tractor and forming a sufficiently heavy frame-work whereby the housing forming the cab is supported firmly and yet without being so solidly built as to result in the windows in the cab being broken as is likely to occur when the structure is too rigid.

Another and further object of my invention is the provision of a cab, the housing of which is light and simple in construction and which forms adequate protection during the cold and wintry weather, and having a plurality of windows therein which may be opened to provide adequate ventilation and also to render the cab open to the air and breezes during the summer when the weather is hot.

I am aware that various cabs have been designed for attachment to tractors of this type, but these cabs are either very light in construction and not substantial enough to afford adequate protection to the operator of the tractor, or they are so heavy that the additional weight superimposed upon the tractor increases the burden and lessens the efficiency of the tractor; and, furthermore, these cabs are exceedingly difficult to detach from the tractor if for any purpose it is desired to remove them for repair purposes or the like. In my improved cab construction a cab is easily attached to the tractor and can be removed therefrom if it is desired for any purpose to tear down the tractor for purposes of repair, and therefore the construction is simple and easily manufactured and easily attached to the tractor.

These and other objects of my invention will be further and better understood by reference to the accompanying sheets of drawings and in which—

Fig. 1 is a side elevational view of the tractor having my improved cabs mounted thereon;

Fig. 2 is a rear elevational view of the tractor shown with the cab attached; and Fig. 3 is a front elevational view of the cab removed from the tractor.

Referring now specifically to the drawings and in which like reference characters refer to like parts throughout, a tractor 10 is shown comprising a frame 11, an engine 12, front wheels 13, a pair of rear wheels 14 and 15 connected by an axle 16 having a housing 17 surrounding the said axle and connected to a differential housing 18. A crank case 19 is provided to which a transmission housing 20 is secured in the usual manner, the said transmission housing 20 having a flange 21 thereon which cooperates with a second flange 22 of the crank case, and through which bolts 23 pass for securing the transmission housing and crank case housing together. All of these parts heretofore described are parts common to the tractor of the Fordson type and which form no part of my present invention.

Referring now to the cab and to the parts composing the same I provide a pair of longitudinally extending right and left floor members 24 and 25 respectively, the member 24 extending underneath the axle housing 17 on the right side of the tractor with a bracket 26 at its rear end, having bolts 27 positioned therethrough by means of which the floor board 24 is secured to the bracket 26, the said bracket 26 being flat at each of its ends and is curved at or near its middle, being secured at its inner end to the differential housing 18 by means of the bolts 28 which pass through the differential housing and hold the various sections thereof together. At the forward end of the member 24 another bracket 29 is provided having bolts 30 passing through the outer end thereof, by means of which the floor board 24 is secured to the flange 21 of the transmission housing by means of the bolts 23, 23 heretofore described, the said bracket 29 extending inwardly and upwardly and is curved laterally to conform to the transmission housing so that the floor board 24 at its forward end is securely fastened to the transmission housing and at its rear end is secured to the differential housing. These parts being standard manufacture and therefore only being necessary to provide the brackets and bolts which are slightly longer than those used in the manufacture of the tractor to secure these brackets to the housing. Another floor board is provided which extends longitudinally underneath the axle housing 17 on the left side of the cab and at its rear end is secured to the differential housing by means of a bracket 30ª similar to the bracket 26 by the bolts 28 which extend through the transmission housing, this bracket corresponding in function to the bracket 26 heretofore described and is attached to the opposite side of the transmission housing from the bracket 26. The floor board 25 is attached to the bracket 30ª by the bolts 31, 31 at its rear end and at its forward end has a bracket similar to the bracket 29 heretofore described by means of which the forward end of this floor board 25 is secured to the transmission housing at its opposite side in exactly the same manner as has been heretofore described with relation to the bracket 29.

Secured to the outer edge of the floor board 24 and in vertical relation therewith is a side member 33 having a half circular recess 34 cut therein which fits around the axle housing 17 and brake drum on the under side thereof and upon which the lower edge of a panel 35 forming one side of the cab housing rests in edge to edge relation therewith, the said panel 35 having a half circular opening 36 which fits over the upper edge of the axle housing 17 and brake drum and is supported upon the member 33. At the opposite side of the cab is a vertical member 37 secured to the member 25 and which corresponds to the member 33 and upon which a panel 38 forming the lower side of the cab housing is placed in exactly the same position as the panel 35 heretofore described, the floor boards 24 and 25 and the side members 33 and 37 forming the supporting members for the upper housing forming the cab. A pair of front angle posts 39 and 39ª are placed in each of the corners of the cab at the front thereof, the said angle posts at their lower ends resting upon the vertical side members 33 and 37, a vertical post 40 being provided which is secured to the angle iron 39, with a lower front member 41 which is secured at its side to the angle iron 39 and is secured to the floor board 24 at its lower end. At the rear corner of the cab is another angle 42 to which is secured a post 43, and the outside panel 35 at its rear end which forms the side of the cab, the said panel 35 being secured at its forward end to the angle 39. Mounted above the panel is a pair of vertically extending spaced posts 45 and 46, between which a window 47 is positioned with windows 48 and 49 placed between the posts 46 and the post 40 respectively and the posts 45 and 43 respectively, these posts together with the corner angles 39 and 42 supporting a roof plate 50 at one side of the cab. The opposite side of the cab is built in exactly the same manner as heretofore described, with a roof plate 51 supported by a rear angle 52 and the front angle 39ª, a vertically extending strip 53 being secured to the said corner angle 52 upon which a rear door 54 is mounted by means of hinges 55, a similar member 56 being positioned at the opposite side of the cab and secured to the angle 42.

A front member 58 is provided which is secured to the angle post 39ª and the floor board 25, above which a post 57 is positioned which is also secured to the angle post 39ª. A frame 59 is mounted between posts 40 and 57 within which a glass window shield or front closure member 60 is positioned, the said member 60 being pivotally mounted at the center thereof upon pins 61 and 62 by means of which this window is turned into a horizontal position if desired. A front strip 63 is provided which extends across the forward side under the roof 64 which is supported by the various vertical members in the manner common to roofs on automobiles or the like. A front member 65 is also provided which is positioned across the forward end of the cab and is secured to the members 41 and 58 at the upper ends thereof.

Attached to the panel 35 on the outer side thereof by means of bolts 66, 66 is a bracket 67 which is bent over the upper edge of the side member 33 and passes downward on the inside thereof and is secured thereto in any approved manner. A similar bracket (not shown) is provided on the opposite side of the tractor which is attached to the panel 38 and to the member 37 these brackets serving to hold the rear end of the housing in proper position. A bracket 68 is provided which is attached to the side member 33 at the front end thereof by means of bolts 70, 70 and is bent over the upper edge of the member 33 and extends upwardly inside of the corner post 39. A similar bracket (not shown) is provided at the opposite side of the housing. It will thus be understood that the cab housing can easily be attached to or removed from the side members 33 and 37 by removing the bolts holding the brackets for purposes of repair or the like.

It will thus be understood that a complete housing is provided which extends over the rear end of the tractor and protects the operator thereof at all times, both in winter and summer weather, this housing being supported by floor sills 24 and 25 and the brackets secured thereto hold the cab securely in position.

There may be various other modifications of the invention, and it is my intention to cover all such modifications which do not involve a departure from the spirit and scope of the invention as set forth in the following claims.

I claim:

1. A cab for tractors comprising a pair of longitudinally extending floor members positioned below the axle housing of the tractor, a pair of brackets secured to the differential housing and to the rear ends of the said floor members, a pair of brackets secured to the transmission housing and to the forward ends of the said floor members, and a superstructure mounted upon the said floor members.

2. A cab for tractors comprising in combination, a pair of longitudinally extending floor plates, a plurality of brackets at the forward end of the said floor plates whereby the said floor plates are secured to the transmission housing of the tractor, a pair of curved brackets extending outwardly from the differential housing, and means for securing the said floor plates at their rear ends to the latter named brackets and a superstructure carried by said floor plates.

Signed at Gary, Indiana, this 10th day of August, 1925.

MARTIN J. KRAUS.